(12) United States Patent
Lee et al.

(10) Patent No.: US 8,817,921 B2
(45) Date of Patent: Aug. 26, 2014

(54) APPARATUS AND METHOD FOR DETECTING PACKET END POINT IN WIRELESS COMMUNICATION SYSTEM

(75) Inventors: Il-Gu Lee, Seoul (KR); Eun-Young Choi, Daejeon (KR); Jung-Bo Son, Daejeon (KR); Hun-Sik Kang, Daejeon (KR); Sok-Kyu Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 357 days.

(21) Appl. No.: 12/965,333

(22) Filed: Dec. 10, 2010

(65) Prior Publication Data

US 2011/0150149 A1 Jun. 23, 2011

(30) Foreign Application Priority Data

Dec. 18, 2009 (KR) ........................ 10-2009-0127468
Apr. 20, 2010 (KR) ........................ 10-2010-0036199

(51) Int. Cl.
*H04L 27/14* (2006.01)
*H04L 27/26* (2006.01)

(52) U.S. Cl.
CPC ................................. *H04L 27/2656* (2013.01)
USPC .......................................................... 375/343

(58) Field of Classification Search
CPC ... H04L 27/2656; H04L 27/2655; H03D 1/00
USPC ........................... 375/259, 260, 316, 343, 340
See application file for complete search history.

(56) References Cited

U.S. PATENT DOCUMENTS

| 2005/0058193 A1* | 3/2005 | Saed ............................. 375/232 |
| 2007/0217525 A1 | 9/2007 | Vrcelj et al. |
| 2008/0186899 A1* | 8/2008 | Zhu et al. ...................... 370/315 |
| 2009/0052426 A1 | 2/2009 | Perraud |
| 2009/0190465 A1* | 7/2009 | Porat et al. .................... 370/210 |
| 2009/0196209 A1* | 8/2009 | Haartsen ....................... 370/311 |

FOREIGN PATENT DOCUMENTS

KR 10-2011-0060309 6/2011

* cited by examiner

*Primary Examiner* — Kevin M Burd
(74) *Attorney, Agent, or Firm* — Staas & Halsey LLP (57) ABSTRACT

An apparatus for detecting a packet end point in a wireless communication system includes: a signal reception unit configured to receive a signal from an outside, convert the signal into a baseband signal, perform analog-digital conversion of the baseband signal, and perform a digital front end; a storage unit configured to store an output of the signal reception unit; a frequency offset estimation unit configured to estimate a frequency offset using the output of the storage unit; a frequency offset correction unit configured to compensate for a frequency error using the estimated frequency offset; an offset correlation unit configured to calculate correlation of the frequency offset and a cyclic prefix; an auto-correlation operation unit configured to calculate auto-correlation of the cyclic prefix; and a packet end detection unit configured to check a packet end point using the auto-correlation.

18 Claims, 11 Drawing Sheets

APPARATUS AND METHOD FOR DETECTING PACKET END POINT IN WIRELESS COMMUNICATION SYSTEM

CROSS-REFERENCES TO RELATED APPLICATIONS

The present application claims priority of Korean Patent Application Nos. 10-2009-0127468 and 10-2010-0036199, filed on Dec. 18, 2009, and Apr. 20, 2010, respectively, which are incorporated herein by reference in their entirety.

BACKGROUND OF THE INVENTION

1. Field of the Invention

Exemplary embodiments of the present invention relate to an apparatus and a method for detecting a packet end point in a wireless communication system; and, more particularly, to an apparatus and a method for detecting a packet end point in a wireless communication system using MIMO-OFDM.

2. Description of Related Art

Much research has recently been performed in the high-speed wireless communication system field to improve the data rate and throughput using various advanced technologies in PHY and MAC layers. In the PHY layer, the data rate has been increased using MIMO, multi-band, OFDM, high-order modulation, use of shorter CP, and link control, and reliability of wireless transmission has been improved by applying advanced channel codec technologies such as Viterbi decoder, turbo code, LDPC, and the like.

In the case of MAC layer, the protocol's overhead can be reduced using packet aggregation and block ACK technologies. Such PHY and MAC research has been performed to improve the maximum coverage and maximum throughput, and much more intensive research is in progress for transmission to transceivers at a larger distance and reliable communication therewith.

And research related to existing technologies has mainly been performed to develop algorithms for improving the performance of demodulators and channel decoders so as to improve performance in low Signal-to-Noise Ratio (SNR), as well as to improve the SNR of RF systems and analog circuits. However, such performance improvement requires that a complicated algorithm be applied to the modem, and implement of the complicated algorithm increases the cost and degrades power consumption efficiency. Furthermore, the limit of RF and analog technologies has restricted the improvement of SNR within the boundary of power and cost competiveness, and different attempts have been made in existing systems to reduce such complexity. That is, there is a need for methods for accurate packet detection in such a low-SNR environment.

Figure 1:
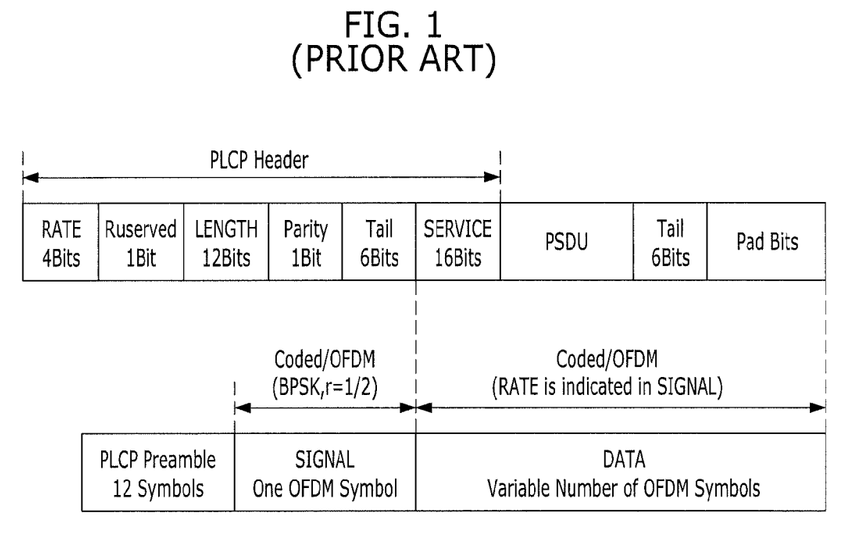
FIG. 1 illustrates a packet structure of a packet-based wireless system.

FIG. 1 illustrates a packet structure of a packet-based wireless system.

Referring to FIG. 1, the signal field includes a Physical Layer Convergence Procedure (PLCP) header, in which the length of the corresponding received packet is encoded, and data conforming to the length is added behind the header and transmitted. Information included in the signal field is very crucial to decoding of a received data packet. Therefore, Binary Phase Shift Keying (BPSK), which is the simplest form of modulation scheme, is used for modulation, and a parity bit is added to the transmitted signal field value, so that the receiver performs parity check and improves reliability.

However, when the input end of the receiver has a channel state of a relatively low SNR, and when the radio environment has a large delay spread, the error probability resulting from channel noise increases due to wireless transmission/reception characteristics, and there is a high probability that the packet length encoded in the signal field will be erroneously decoded. Such erroneous decoding of the packet length in the signal field of a received packet is followed by erroneous determination of the packet end point in the case of a packet-based wireless communication system, as well as by errors regarding the initialization time of the receiver finite state machine. As used herein, the finite state machine generally refers to a device having a memory configured to store past states/signals. Such erroneous initialization time of the receiver finite state machine seriously degrades system performance in the following two aspects:

Firstly, decoding into a length larger than the actual packet length initializes the finite state machine in the middle of the received packet, and thus the packet is dropped. More specifically, if the packet length is decoded shorter, the receiver is initialized, even in the middle of receiving a packet, and tries to receive a new packet. This means that, after the packet is dropped, the receiver continues the steps of carrier sensing, automatic gain control, synchronization, and signal field decoding. This unnecessarily consumes an excessive amount of power until the actual packet end point arrives.

Secondly, if the packet length is decoded larger than the actual packet length, the finite state machine fails to be initialized, even if the packet reception has ended, and fails to receive the next incoming packet. In this case, the longer the erroneously decoded packet is compared with the actual packet length, the more burst packet errors occur, degrading the receiver minimum sensitivity and the system's overall throughput. When it comes to wireless communication system design, the receiver minimum sensitivity is an important performance index determining the coverage, and the throughput is a critical factor of the user capacity. Therefore, there is a need for research for packet detection that can improve receiver minimum sensitivity and throughput.

SUMMARY OF THE INVENTION

An embodiment of the present invention is directed to an apparatus and a method for detecting a packet end point, which can reduce the complexity of modem implementation.

Another embodiment of the present invention is directed to an apparatus and a method for detecting a packet end point, which can increase receiver minimum sensitivity.

Another embodiment of the present invention is directed to an apparatus and a method for detecting a packet end point, which can increase throughput.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, an apparatus for detecting a packet end point in a wireless communication system includes: a signal reception unit configured to receive a signal from an outside, convert the signal into a baseband signal, perform analog-digital conversion of the baseband signal, and perform a digital front end; a storage unit configured to store an output of the signal reception unit; a frequency offset estimation unit configured to estimate a frequency offset using the output of the storage unit; a frequency offset correction unit configured to compensate for a frequency error using the estimated frequency offset; an offset correlation unit configured to calculate correlation of the frequency offset and a cyclic prefix; an autocorrelation operation unit configured to calculate autocorrelation of the cyclic prefix; and a packet end detection unit configured to check a packet end point using the autocorrelation.

In accordance with another embodiment of the present invention, a method for detecting a packet end point in a wireless communication system includes: receiving a signal from an outside, converting the signal into a baseband signal, performing analog-digital conversion of the baseband signal, and performing a digital front end; storing a signal to which the digital front end has been performed; estimating a frequency offset using the stored signal and compensating for a frequency error using the estimated frequency offset; calculating correlation of the frequency offset and a cyclic prefix and calculating auto-correlation of the cyclic prefix; and checking a packet end point using the auto-correlation.

DESCRIPTION OF SPECIFIC EMBODIMENTS

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

The present invention is directed to reliable packet end detection when a low-SNR environment, in which an existing system operates, causes erroneous decoding of a packet length of a signal field and thus erroneous decoding of a parity check bit. If the erroneously decoded packet length is larger than the actual packet length, the receiver may fail to be initialized and cause burst packet errors. In order to avoid the probability of such problems, correlation of the CP is used to detect the packet end point.

In accordance with the present invention, the carrier frequency offset that may occur in the RF is compensated for, and correlation of the CP is obtained, so that reliable results are obtained in various channel environments. When multiple antennas and multi-bands are used, correlation of signals coming from a plurality of reception paths and bands is used to increase the accuracy.

An exemplary embodiment of the present invention will now be described in detail with reference to the accompanying drawings.

Figure 2:
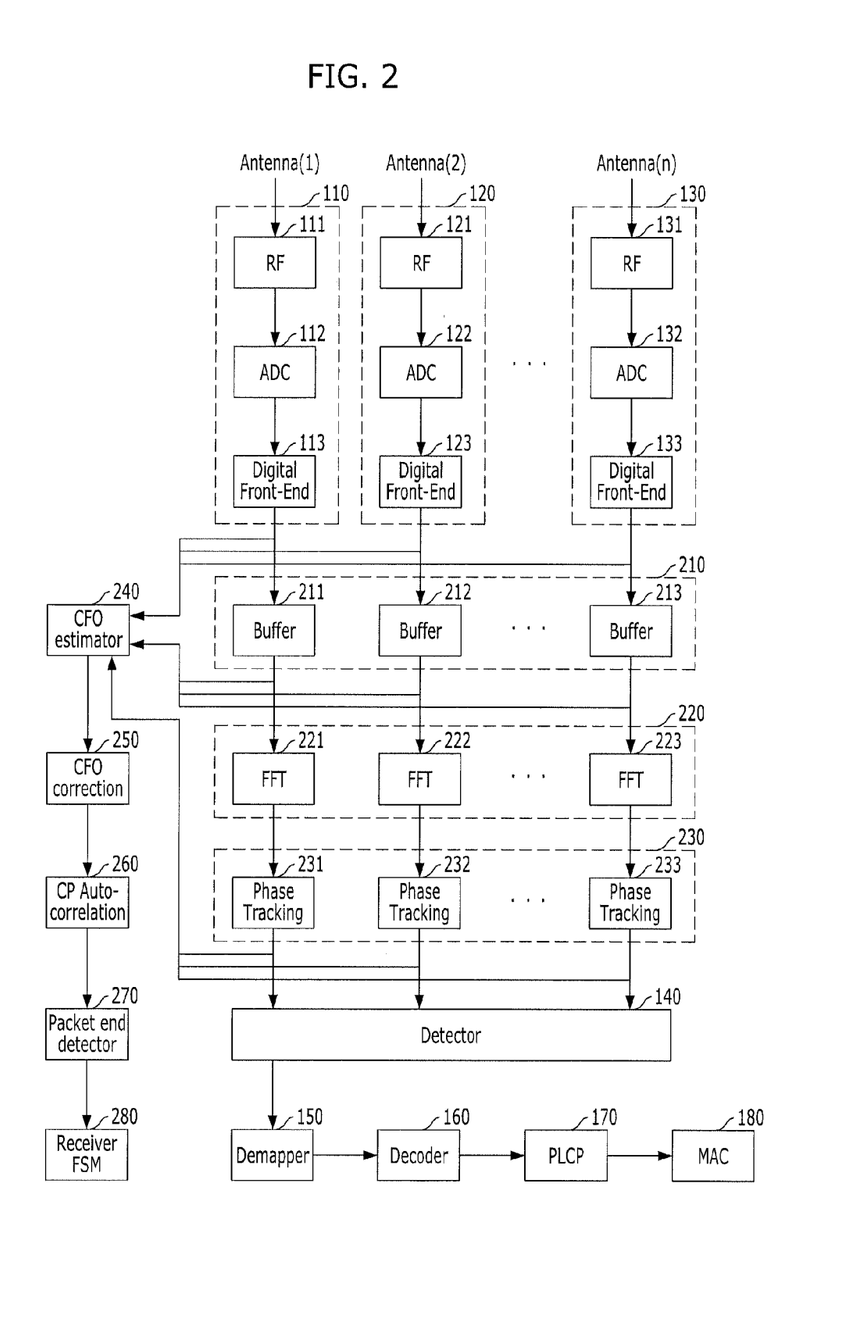
FIG. 2 is an overall block diagram illustrating a receiver using an apparatus for obtaining a packet end point for a wireless communication system using multiple antennas or a single antenna in accordance with an embodiment of the present invention.

FIG. 2 is an overall block diagram illustrating a receiver using an apparatus for obtaining a packet end point for a wireless communication system using multiple antennas or a single antenna in accordance with an embodiment of the present invention.

Referring to FIG. 2, the receiver includes radio signal processing units 110 to 130, an input buffering unit 210, a Carrier Frequency Offset (CFO) estimator 240, a CFO correction unit 250, a CP auto-correlation operation unit 260, a packet end detector 270, a receiver Finite State Machine (FSM) 280, a FFT processing unit 220, a phase tracking unit 230, a detector 140, a demapper 150, a decoder 160, a PLCP 170, and a MAC 180. The radio signal processing units 110 to 130 include RF units 111 to 131, analog/digital converters 112 to 122, and digital front-end units 131 to 133, respectively.

The RF units 111 to 131 of the radio signal processing units 110 to 130 are configured to demodulate signals, which have been received by respective antennas, into baseband signals and transfer the baseband signals to the analog/digital converters 112 to 132. The analog/digital converters 112 to 132 are configured to convert the demodulated analog signals from the RF units 111 to 131 into digital signals and transfer the digital signals to the digital front-end units 131 to 133. In the case of a receiver in a wireless communication system, signals converted into digital signals and then inputted exhibit various types of distortion, such as a CFO caused by the center frequency of the RF, a sampling phase offset caused by analog/digital converters, phase and size offsets between I and Q channels that may occur in various devices and PCB transmission lines, and the like, and the received signal gain may deviate from the given input operation range. In order to compensate for this, the digital wireless communication system has digital front-end units 113 to 133 implemented after the analog/digital converters 112 to 132 to compensate for distortions occurring in RF and analog devices. Outputs of the digital front-end units 113 to 133 are transferred to the input buffering unit 210 and the CFO estimator 240.

The input buffering unit 210 is configured to divide burst data, which has been received from the digital front-end units 131 to 133, into symbols and store them symbol by symbol so that the FFT operators can classify and operate sub-carriers symbol by symbol. The input and output frequencies of the buffers may be designed differently so as to solve the difference of operating clock between data before FFT and data thereafter. For example, when the input and output operate at 40 MHz and 80 MHz, respectively, input is made at 40 MHz and output is made from the buffers after reading at 80 MHz, in order to solve the difference between both clocks.

With regard to signals outputted from the buffers, the CFO is compensated for using correlation obtained by operating short and long CPs. In this case, a residual CFO operated with a pilot extracted after FFT is also accumulated and compensated for from the buffer output signals. Signals outputted from the input buffering unit 210 are transferred to the FFT processing unit 220 and the CFO estimator 240.

The FFT processing unit 220 is configured to perform FFT of data from the input buffering unit 210 and transfer the data to the phase tracking unit 230. The phase tracking unit 230 is configured to track the phase of data from the FFT processing unit 220 and transfer the phase to the detector 140 and the CFO estimator 240. Operations of the demapper 150, the decoder 160, the PLOP 170, and the MAC 180 are widely known in the art, and detailed description thereof will be omitted herein.

The CFO estimator 240 is configured to receive input/output of the input buffering unit 210 and phase information of the phase tracking unit 230 and estimate the CFO. The CFO correction unit 250 is configured to correct the CFO using a CFO value received from the CFO estimator 240. Radio signals received from respective antennas are buffered before performing FFT, and auto-correlation of short and long preambles is used to calculate a time-domain CFO value, which is added to a residual CFO value obtained using a pilot in the frequency domain, to correct the CFO.

The CP auto-correlation operation unit 260 is configured to operate auto-correlation of the CP stored in the buffers, after the CFO correction unit 250 has corrected the CFO, because no accurate auto-correlation result can be obtained in the presence of CFO. Auto-correlation is obtained using a CP in the following manner: samples of each symbol are stored for a period of 0.8 us staring from the first sample in the time domain, and the stores samples are moved sample by sample and multiplied. Due to characteristics of OFDM using CP, the first 0.8 us period of a symbol has the same sequence as the last 0.8 us period of the symbol. Therefore, when correlation is obtained within a symbol in this manner, the largest correlation is obtained at the end of the symbol. Applying this principle to obtain auto-correlation with regard to the entire symbols of a packet shows that correlation increases every 4 us, and correlation of 4 us period disappears after the end of the packet.

The packet end detector 270 is configured to monitor the size and periodicity of such correlation and determine whether the packet has ended or continued. In a channel environment with severe interference or relative large delay spread, such a correlation value does not stand out at a specific time, but is distributed over a longer time range. Therefore, a window for observing the correlation value can be set as a programmable register, and the detection threshold for determining the correlation size with noise correlation is also designed to be set as a programmable register. IEEE 802.11n standards provide, in order to support higher throughput, not only 0.8 us GI, but also 0.4 us GI, so that either GI can be selected to obtain correlation using a programmable register.

The receiver FSM 280 is configured to determine the state of the receiver based on information received from the packet end detector 270.

Figure 3:
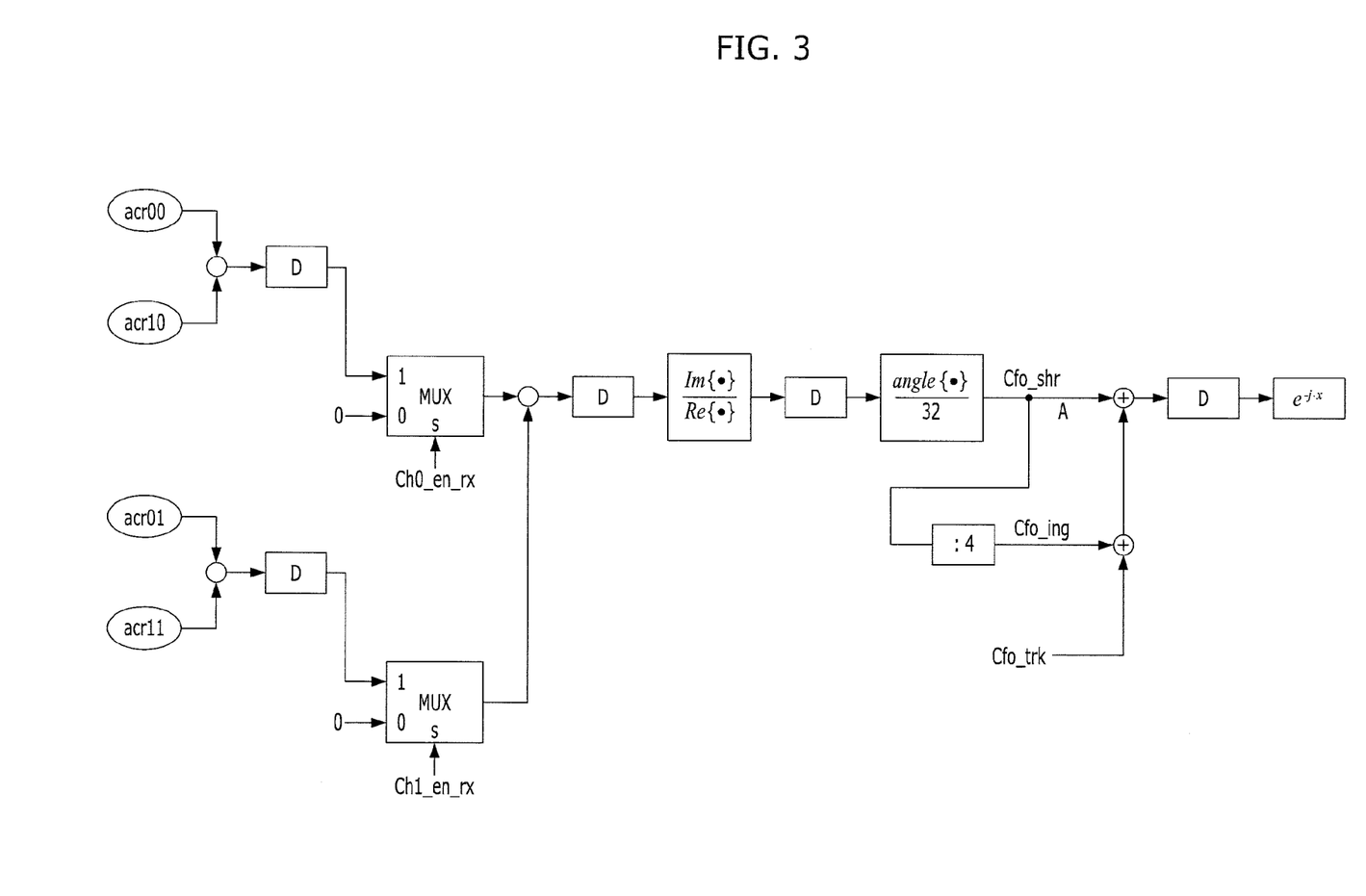
FIG. 3 is a circuit diagram for estimating and correcting CFO in accordance with an embodiment of the present invention.

FIG. 3 is a circuit diagram for estimating and correcting a CFO in accordance with an embodiment of the present invention.

It will be assumed in the following description with reference to FIG. 3 that two antennas are used, although the same circuit is also applicable when a single antenna or a plurality of antennas is used. From short and long preambles received from the two antennas, two CFOs, i.e. cfo_shr and cfo_lng are estimated. These values are estimated once for each received packet, and the residual CFO, i.e. cfo_trk has its estimate obtained from a pilot value included in the data symbol. This value is estimated by accumulating a number of symbols using a pilot after FFT. These three types of estimated CFOs are added to the previously accumulated value for each operating frequency and reflected in the data sequence. This CFO estimation and correction device can be designed to be used not only for the data path, but also commonly for the apparatus in accordance with the present invention.

Figure 4:
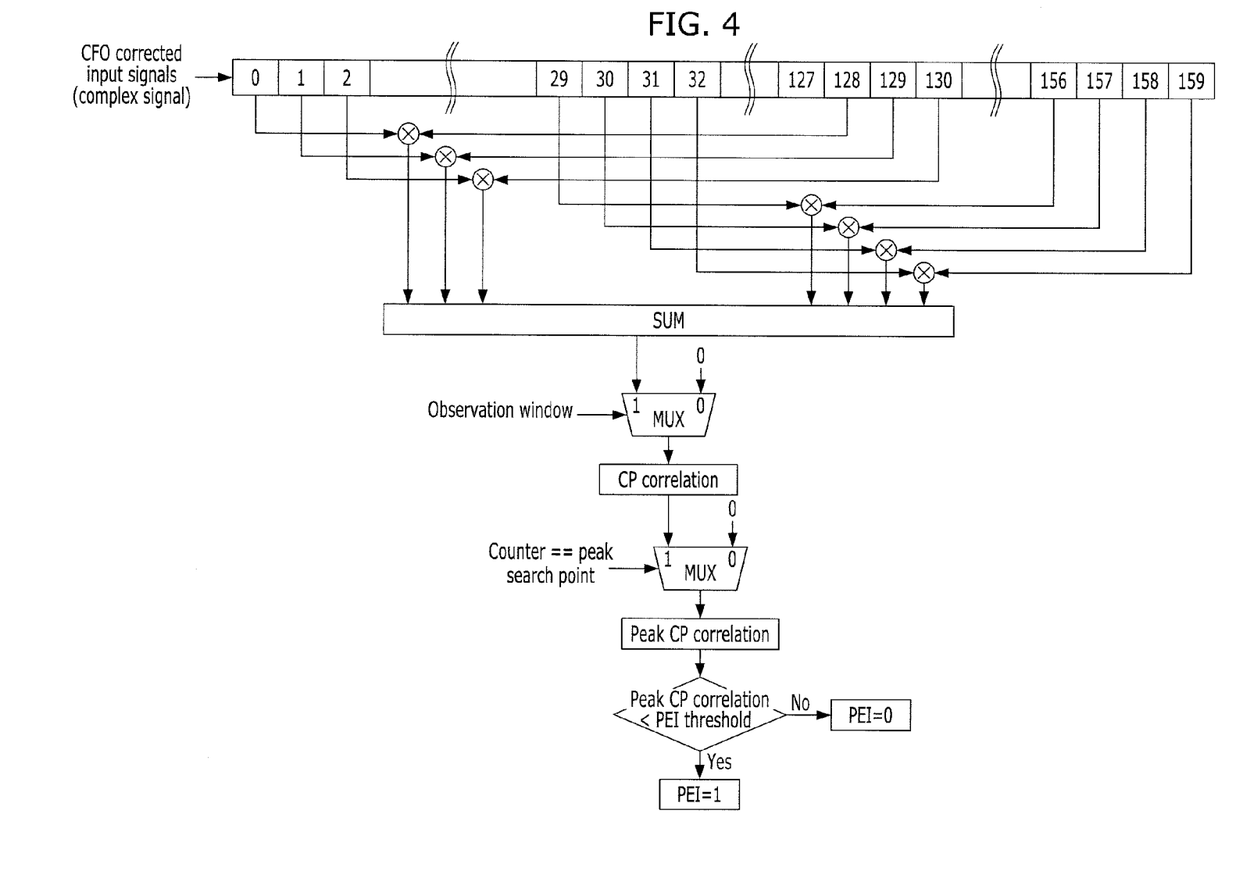
FIG. 4 is a conceptual diagram illustrating a process of detecting a packet end point by calculating correlation of a CP of a signal, the CFO of which has been corrected, in accordance with an embodiment of the present invention.

FIG. 4 is a conceptual diagram illustrating a process of detecting a packet end point by calculating correlation of a CP of a signal, the CFO of which has been corrected, in accordance with an embodiment of the present invention.

In a OFDM-based wireless communication system, the buffer size of a correlation calculator is determined by considering the number of carrier frequencies corresponding to one symbol and the operating frequency of the corresponding calculation block. It will be assumed in the following description that, in order to support up to 40 MHz mode of 802.11n standards, 128 carrier frequencies are considered, and the correlation calculator operates at an operating frequency of 40 MHz. In this case, the CP length may be 800 ns or 400 ns, which corresponds to a sample number of 32 or 16. The type of correlation operation is different depending on the mode after decoding of short GI information of the signal field. More specifically, in the case of 800 ns mode (i.e. long GI), correlation of the CP is obtained by multiplying a signal, which has been buffered from sample no. 0 to sample no. 31, with a signal buffered from sample no. 128 to sample no. 159, and adding them, as illustrated in FIG. 4. In the case of a short GI, samples nos. 0-15 and 144-159 are used. The correlation observation window can be programmed as a register, and the correlation is outputted only within the observation window so as to improve the reliability of results depending on channel environments. The CP correlation operated within the observation window outputs a peak value when the counter of the operator reaches a specific value, i.e. CP length. The peak value is compared with a threshold and, when the peak value is below the threshold, it is determined that the packet has ended, and a packet end indicator of 1 is outputted; and if not, it is announced that the packet has not ended using a packet end indicator of 0. The packet end indicator is transferred to a FSM that controls the receiver, and a packet end indicator of 1 causes initialization in the current state.

On the other hand, the data path is demodulated after correcting the phase offset using a pilot signal extracted from a result of FFT. Signal field information is analyzed from a sequence decoded by the demapper and decoder, and data and signal information are then transferred to the MAC.

In accordance with the present invention, when the receiver is in such a poor channel environment that the packet length of a signal field is erroneously decoded, the packet end point is determined accurately. Therefore, when the decoded packet length is smaller than the actual packet length, and thus the packet is dropped, the digital front end units of the receiver are solely supplied with power and clock so as to improve power consumption efficiency of the receiver. When the decoded packet length is larger than the actual packet length, auto-correlation of the CP is used to accurately detect the packet end and initialize the receiver FSM. This reduces the probability of burst packet errors.

Figure 5A:
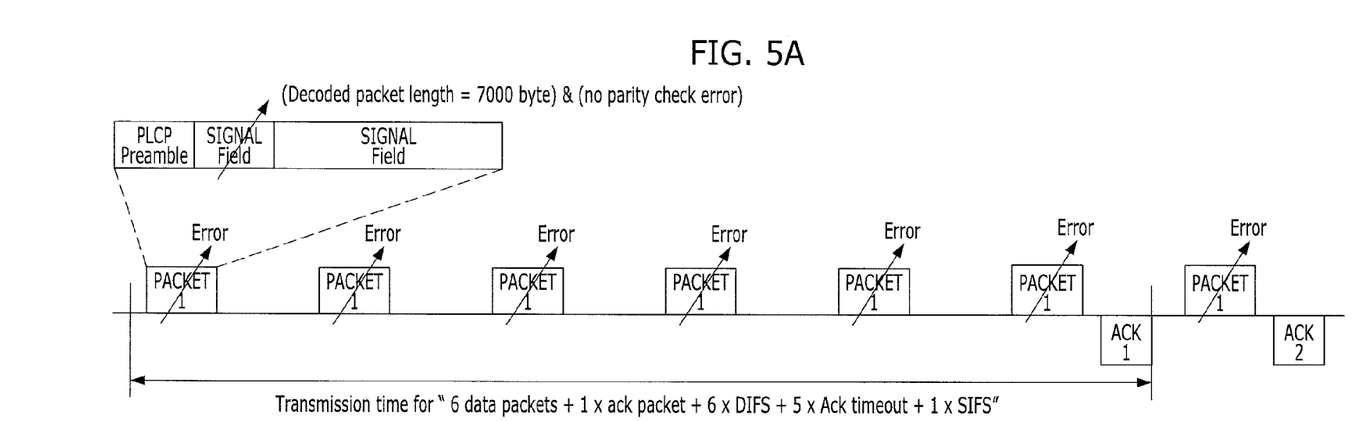
FIGS. 5A and 5B illustrate a method for calculating throughput according to whether there is transmission error or not.
Figure 5B:
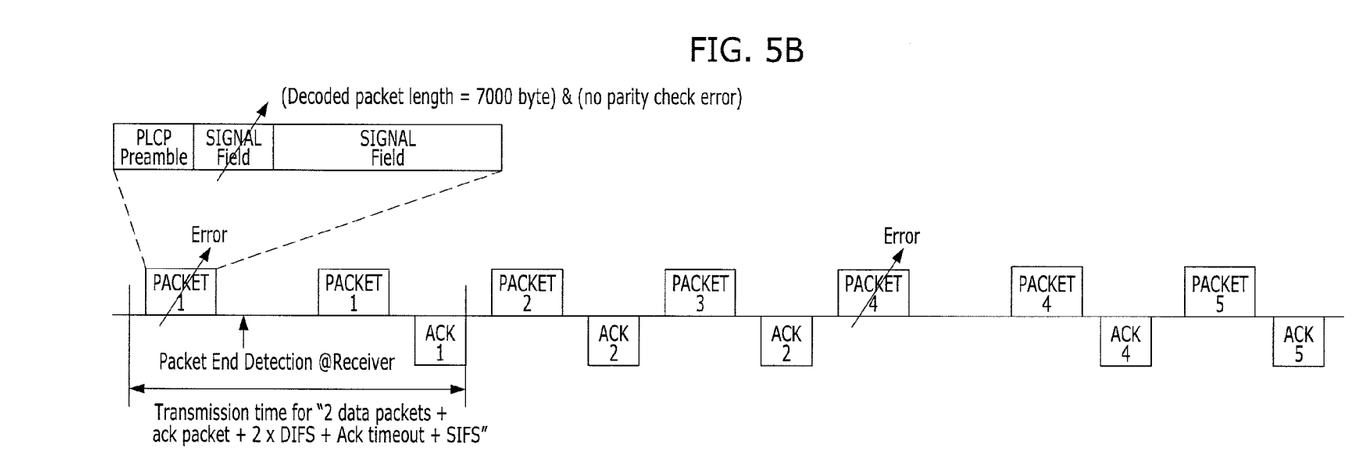

FIGS. 5A and 5B illustrate a method for calculating throughput according to whether there is transmission error or not.

In FIG. 5A, throughput is obtained by dividing the payload of a successfully transmitted packet by time taken to transmit the packet. A wireless LAN adopts DCF and, when there is no packet error, a time needed to transmit a packet is the sum of DIFS time, backoff time, packet transmission time, SIFS time, and ACK transmission time.

In FIG. 5B, packet errors occur, and the terminal that has transmitted a data packet fails to receive an ACK packet. The total transmission time is, due to time for retransmission of the packet that has failed to be transmitted, as follows: DIFS time+backoff time+packet transmission time+ACK timeout time+DIFS time+backoff time+packet transmission time+SIFS time+ACK transmission time. That is, the more packet errors occur, the longer the transmission time becomes, and the lower throughput becomes.

Figure 6A:
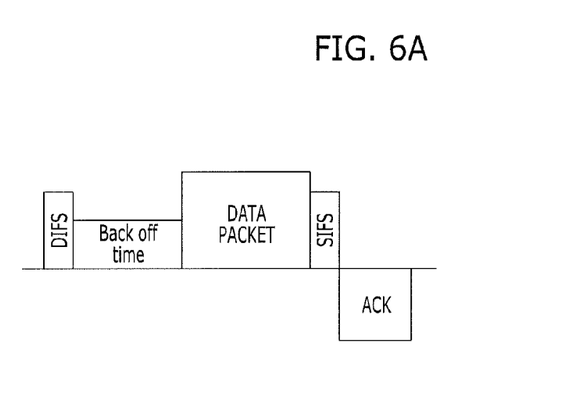
FIGS. 6A and 6B illustrate effects on a wireless LAN protocol when an apparatus in accordance with the present invention is not applied and when applied, respectively.
Figure 6B:
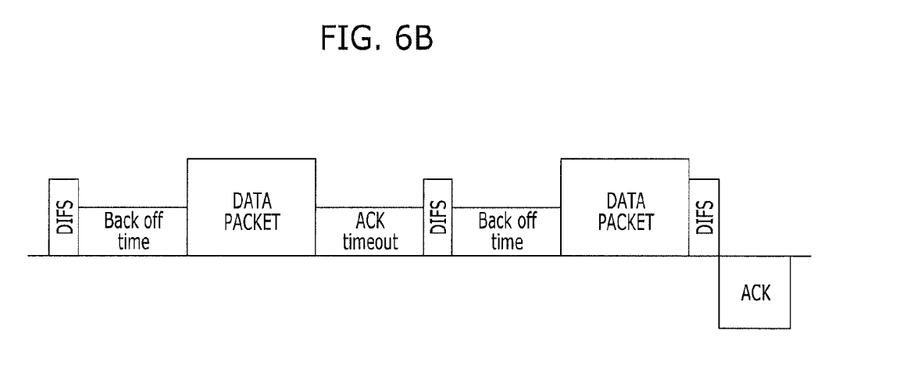

FIGS. 6A and 6B illustrate effects on a wireless LAN protocol when an apparatus in accordance with the present invention is not applied and when applied, respectively.

Referring to FIG. 6A, in a low-SNR situation, the packet length of a signal field is erroneously decoded, and so is the parity check bit. Then, the packet end point is erroneously recognized as 7000 bytes, not 1000 bytes. As a result, while the packet as long as 7000 bytes is transmitted, the receiver FSM is not initialized, failing to receive the next transmitted packet. This degrades throughput.

In the case of FIG. 6B, even if the packet length of a signal length and the parity check bit are erroneously decoded, the packet end point is determined in accordance with the present invention so that the receiver FSM is initialized and successfully receives the next packet. Comparison of throughput between the two situations shows that the throughput is at least through times higher, when the packet end point is accurately known using an apparatus in accordance with the present invention, than when the packet end point is not known. This improvement of throughput is in proportion to the erroneously decoded packet length of the signal field, and the larger the distance between both terminals (thus the receiver's input signal is smaller), the higher the probability of such a phenomenon becomes.

FIGS. 7A to 7D and 8A to 8D illustrate simulation results showing effects of the present invention.

Specifically, ten packets of 100 bytes are transmitted at a rate of 6 Mbps and a SNR of 3 dB over a 50 ns RMS delay spread channel. For convenience of experiment, terminal vs. terminal tests are performed using an 11a physical layer model in no-ACK mode. As a channel distortion phenomenon, time and frequency offsets of 40 ppm are given, respectively. FIGS. 7A to 7D correspond to a case where no apparatus in accordance with the present invention is used. Images are numbered clockwise staring from the image on the first row and first column. In the case of image no. 1, i.e. FIG. 7A, the blue color represents operated correlation, and red color represents extracted maximum values of correlation.

Figure 7A:
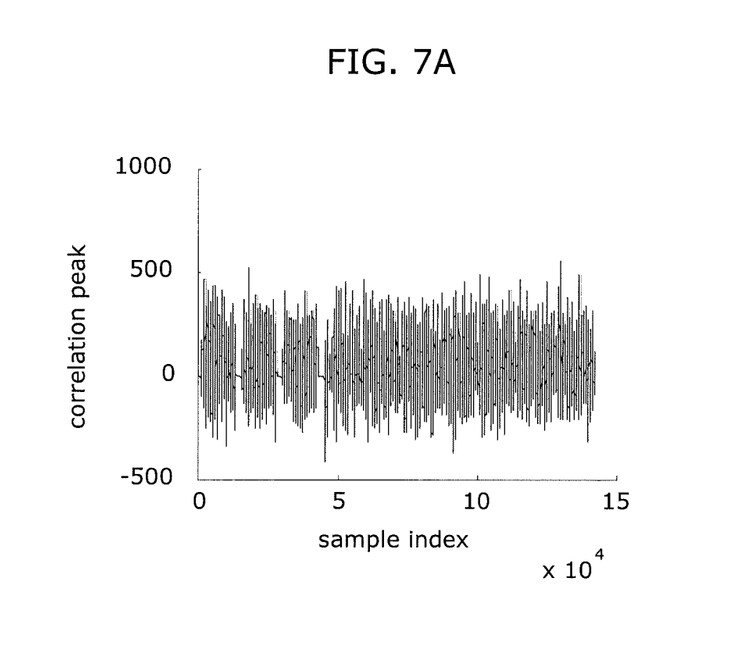
FIGS. 7A to 7D and 8A to 8D illustrate simulation results showing effects of the present invention.
Figure 7B:
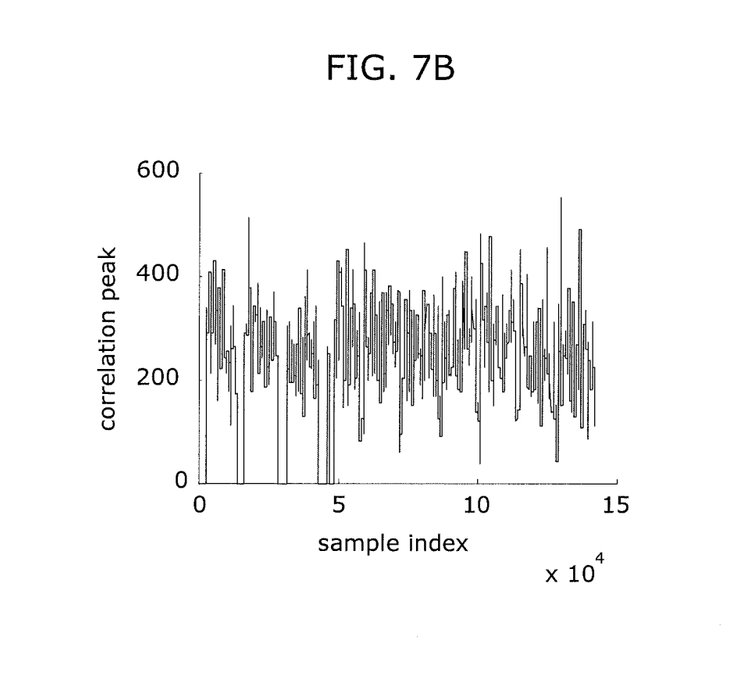
Figure 7C:
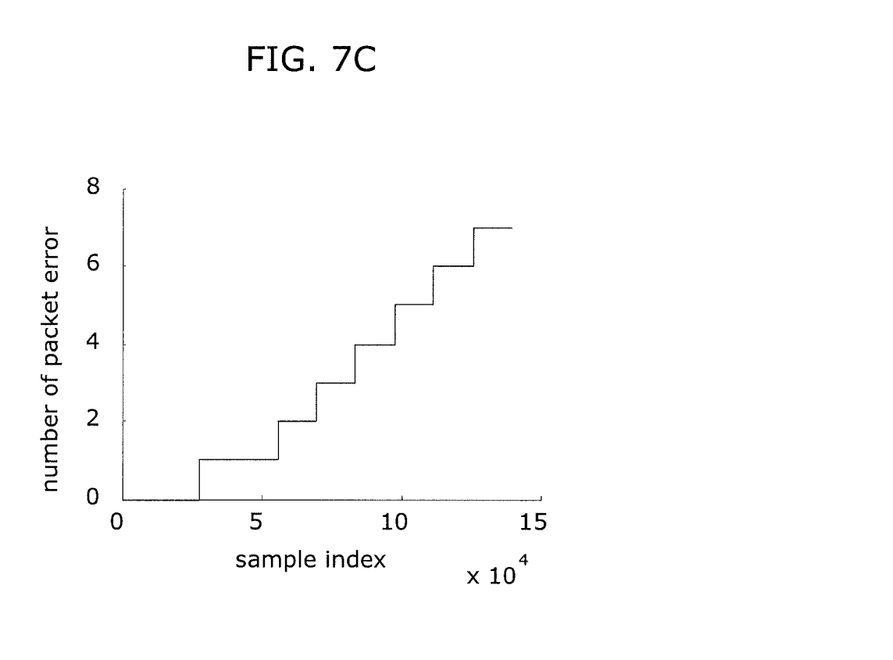
Figure 7D:
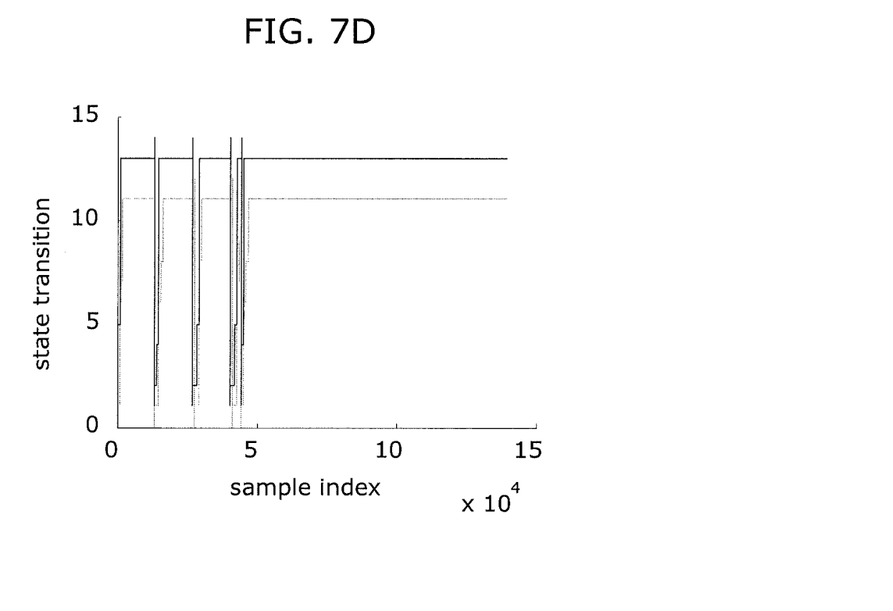

Image no. 2, i.e. FIG. 7B shows a result of extracting, in the CP, peak values from the extracted maximum values of image no. 1, i.e. FIG. 7A. It is clear from image no. 3, i.e. FIG. 7C that, since no apparatus in accordance with the present invention is used, erroneous decoding of packet length of the third packet results in burst packet errors up to the tenth packet. This is because, as illustrated in image no. 4, i.e. FIG. 7D, the receiver's state transition diagram has failed to be initialized. In this case, blue and red colors represent front-end state transition and back-end state transition for supporting Reduced Interframe Space (RIFS), respectively.

Figure 8A:
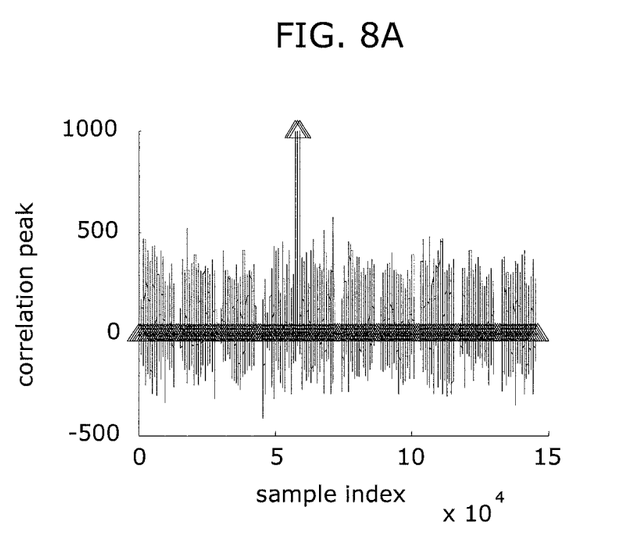
Figure 8B:
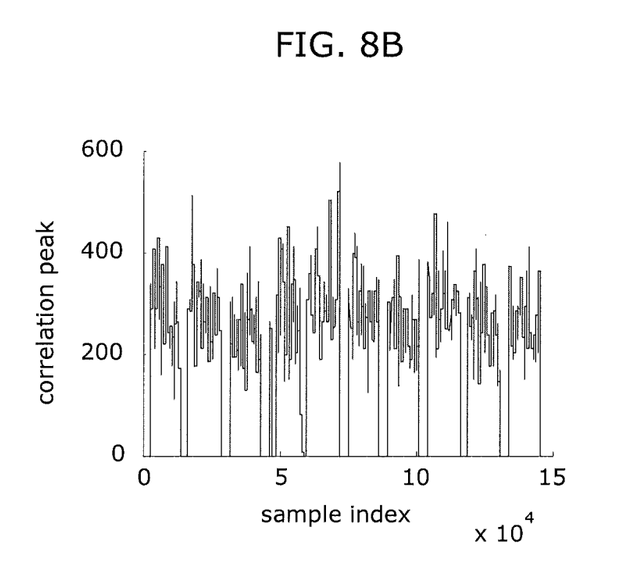
Figure 8C:
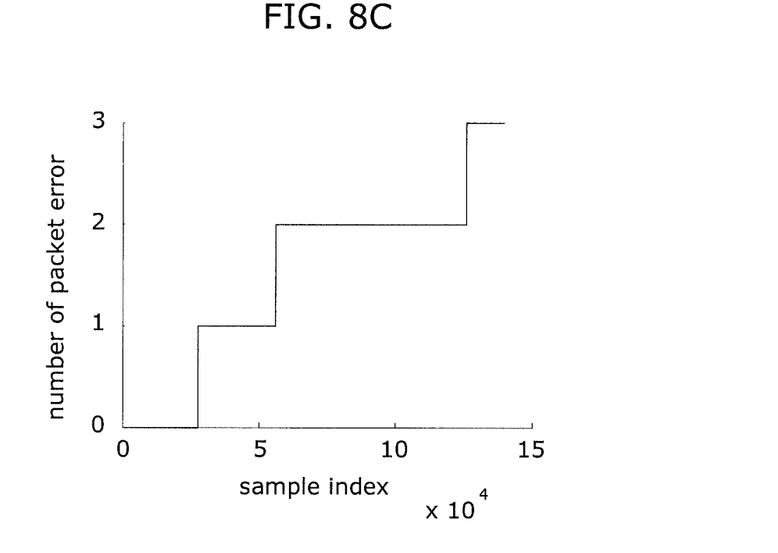
Figure 8D:
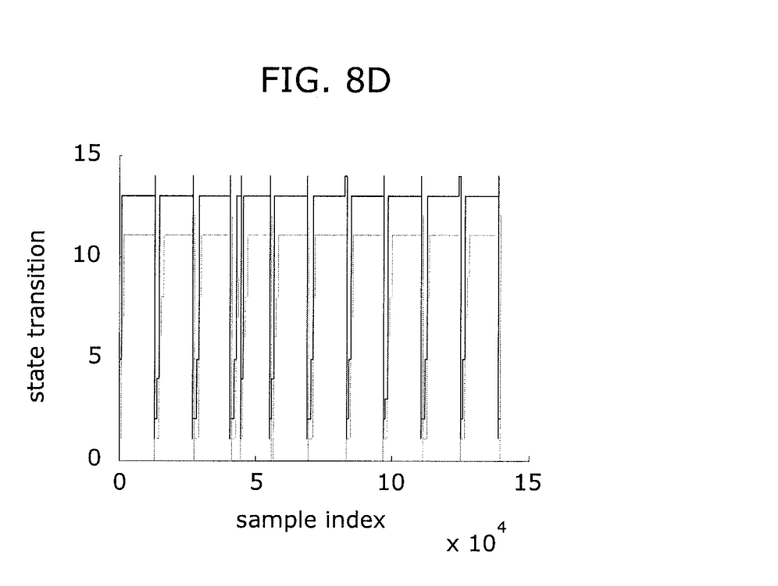

FIGS. 8A to 8D correspond to a case where an apparatus in accordance with the present invention is applied. Referring to image no. 1, i.e. FIG. 8A, the packet end is detected when the third packet is completely received, and the reception state transition control block is informed of a packet end indicator, as marked by a block triangle in the image. Then, the state transition is initialized, as illustrated in image no. 4, i.e. FIG. 8D, so that the next packet is normally received. Wherein, Image no. 2, i.e. FIG. 8B shows a result of extracting, in the CP, peak values from the extracted maximum values of image no. 1, i.e. FIG. 8A. It is clear from image no. 3, i.e. FIG. 8C that, since apparatus in accordance with the present invention is used.

It is clear from FIGS. 7A to 7D and 8A to 8D that the apparatus in accordance with the present invention can solve the problem that erroneous decoding of packet length and parity check bit in a poor channel state causes a failure to initialize the reception state transition control block and a following failure to receive the next packet successively. This example shows that, when ten packets are used, use of an apparatus in accordance with the present invention results in three packet errors, while use of no apparatus in accordance with the present invention results in seven packet errors.

Figure 9:
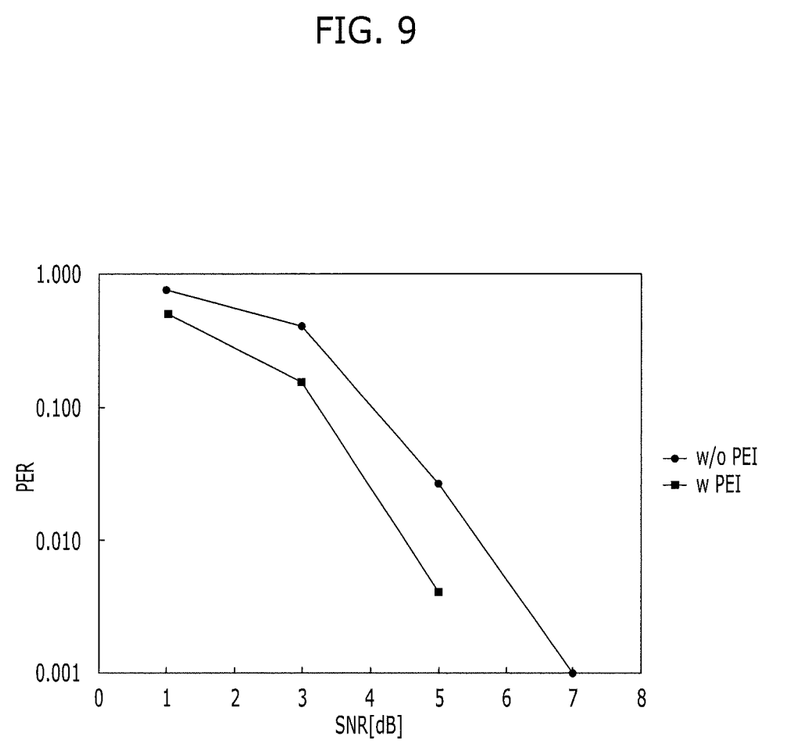
FIG. 9 illustrates a result of simulating a packet error rate per SNR in a wireless LAN channel model environment.

FIG. 9 illustrates a result of simulating a packet error rate per SNR in a wireless LAN channel model environment. The wireless LAN channel environment settings include a 50 ns RMS delay spread channel and time and frequency offsets of 40 ppm, respectively, and a sufficiently low SNR is used for simulation. The result of simulation shows that, in the case of 1,000 packets of 1000 bytes, the present invention has performance improvement of about 1 dB.

In accordance with the exemplary embodiments of the present invention, burst packet errors due to erroneous packet length decoding, which could occur when the transmission end and the receiver are at a large distance from each other or when the channel state is poor, are avoided. As a result, even in a poor channel environment, coverage and system stability are improved. The power consumption efficiency of wireless terminals is increased. Furthermore, use of a plurality of reception antennas and multi-band information increases the accuracy of correlation, which is obtained through RF frequency offset compensation, thereby guaranteeing accurate detection of a packet end point even in poor channel environments.

While the present invention has been described with respect to the specific embodiments, it will be apparent to those skilled in the art that various changes and modifications may be made without departing from the spirit and scope of the invention as defined in the following claims.

What is claimed is:

1. An apparatus to detect a packet end point in a wireless communication system, comprising:
   a signal reception unit configured to receive a signal from a plurality of reception paths and bands;
   an offset correlation unit configured to calculate a cyclic prefix of the signal;
   an auto-correlation operation unit configured to calculate auto-correlation of the cyclic prefix; and
   a packet end detection unit configured to monitor size and periodicity of the auto-correlation, and detect a packet end point by using the auto-correlation, and
   wherein a receiver Finite State Machine (FSM) is initialized at the packet end point detected by the auto-correlation.

2. The apparatus of claim 1, wherein the packet end point is detected by using correlation of signals being transmitted from the plurality of reception paths and bands.

3. The apparatus of claim 1, comprising:
   a frequency offset estimation unit configured to estimate a frequency offset of the signal; and
   a frequency offset correction unit configured to compensate for a frequency error of the estimated frequency offset,
   wherein the offset correlation unit calculates a correlation of value of the compensated frequency offset, and
   wherein the frequency offset correction unit compensates for the frequency error by adding a frequency offset calculated in time domain using auto-correlation and a residual frequency offset calculated in frequency domain using a pilot.

4. The apparatus of claim 1, wherein the auto-correlation operation unit stores partial or entire samples during a cyclic prefix of a symbol in time domain, multiplies the stored samples while moving the samples sample by sample, and calculates auto-correlation of the cyclic prefix.

5. The apparatus of claim 1, wherein the packet end detection unit sets an observation window for observing the auto-correlation as a programmable register.

6. The apparatus of claim 1, wherein the packet end detection unit sets a detection threshold for comparing a size of the auto-correlation with noise correlation as a programmable register.

7. The apparatus of claim 1, wherein the packet end point is determined by using a peak value of the auto-correlation according to a length of the cyclic prefix.

8. The apparatus of claim 1, wherein a receiver operates in power save based on the packet end point detected by the auto-correlation.

9. The apparatus of claim 1, wherein a digital front end of a receiver is solely supplied with power or clock at the packet end point detected by the auto-correlation in order to save power consumption of the receiver.

10. A method of detecting a packet end point in a wireless communication system, comprising:
receiving a signal from a plurality of reception paths and bands;
calculating a cyclic prefix and an auto-correlation of the cyclic prefix; and
monitoring size and periodicity of the auto-correlation, and detecting a packet end point by using the auto-correlation, and
wherein a receiver Finite State Machine (FSM) is initialized at the packet end point detected by the auto-correlation.

11. The method of claim 10, wherein the packet end point is detected by using correlation of signals being transmitted from the plurality of reception paths and bands.

12. The method of claim 10, comprising:
estimating a frequency offset of the signal, and compensating for a frequency error of the estimated frequency offset;
calculating a correlation value of the compensated frequency, and
wherein the frequency error is compensated for by adding a frequency offset calculated in time domain using auto-correlation and a residual frequency offset calculated in frequency domain using a pilot.

13. The method of claim 10, wherein the calculating the cyclic prefix and the auto-correlation of the cyclic prefix stores partial or entire samples during a cyclic prefix of a symbol in time domain, multiplies the stored samples while moving the samples sample by sample, and calculates auto-correlation of the cyclic prefix.

14. The method of claim 10, wherein the detecting the packet end point sets an observation a window for observing the auto-correlation as a programmable register.

15. The method of claim 10, wherein the detecting the packet end point sets a detection threshold for comparing a size of the auto-correlation with noise correlation as a programmable register.

16. The method of claim 10, wherein the packet end point is determined by using a peak value of the auto-correlation according to a length of the cyclic prefix.

17. The method of claim 10, wherein a receiver operates in power save based on the packet end point detected by the auto-correlation.

18. The method of claim 10, wherein a digital front end of a receiver is solely supplied with power or clock at the packet end point detected by the auto-correlation in order to save power consumption of the receiver.

* * * * *